(12) United States Patent
Ohki et al.

(10) Patent No.: US 6,735,499 B2
(45) Date of Patent: May 11, 2004

(54) METHOD AND APPARATUS FOR CONTROLLING COOLING FAN

(75) Inventors: Yasuyuki Ohki, Sagamihara (JP); Minoru Kida, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/090,664

(22) Filed: Mar. 5, 2002

(65) Prior Publication Data

US 2002/0140389 A1 Oct. 3, 2002

(30) Foreign Application Priority Data

Mar. 6, 2001 (JP) .......................... 2001-062536

(51) Int. Cl.$^7$ ............................ G05D 23/30; G06F 1/20; H05K 7/20
(52) U.S. Cl. ........................ 700/299; 361/687; 702/132
(58) Field of Search .......................... 700/9, 28, 32–34, 700/275, 276, 278, 280, 299, 300; 702/99, 132; 165/244, 247; 361/687, 688, 695

(56) References Cited

U.S. PATENT DOCUMENTS

| | | | | |
|---|---|---|---|---|
| 5,727,928 A | * | 3/1998 | Brown ..................... | 417/44.11 |
| 5,926,386 A | * | 7/1999 | Ott et al. ..................... | 700/70 |
| 6,134,667 A | * | 10/2000 | Suzuki et al. ................ | 713/300 |
| 6,172,611 B1 | * | 1/2001 | Hussain et al. ............. | 340/584 |
| 6,414,843 B1 | * | 7/2002 | Takeda ........................ | 361/687 |
| 6,487,668 B2 | * | 11/2002 | Thomas et al. ............. | 713/322 |
| 6,643,128 B2 | * | 11/2003 | Chu et al. .................... | 361/687 |
| 2003/0120394 A1 | * | 6/2003 | Ziarnik ........................ | 700/300 |

FOREIGN PATENT DOCUMENTS

DE 19705134 A1 * 4/1998

* cited by examiner

*Primary Examiner*—Leo Picard
*Assistant Examiner*—Paul Rodriguez
(74) *Attorney, Agent, or Firm*—J. Bruce Schelkopf

(57) ABSTRACT

According to the present invention, it is possible to reduce the fan noise taking the human sense into consideration. Specifically, it is possible to ergonomically mitigate the discomfort due to the short-term variation of the working rate of the CPU by increasing the rotational frequency gradually and by decreasing the rotational frequency with the temperature fall taking the human sense of noise into account. The present invention reduces noise produced by a cooling fan by controlling the fan rotation to a minimum rotational frequency in accordance with the specification and performance of the heat source. Additionally, an embodiment of the present invention controls a cooling fan to a minimum allowable rotational frequency within a rated temperature range of the object to be cooled, thereby controlling the internal temperature of a computer system in such a way to minimize noise generation.

5 Claims, 5 Drawing Sheets

METHOD AND APPARATUS FOR CONTROLLING COOLING FAN

BACKGROUND OF THE INVENTION

1. Field of the Invention

The present invention relates to a method for controlling a cooling fan to dissipate heat generated by a CPU, a power supply, and other electrical components in a computer system, and more particularly to a control method for reducing the noise generated by the cooling fan.

2. Background of Related Art

Generally, a computer system comprises a board with various LSI chips such as a CPU mounted thereon, a storage device such as a hard disk, a battery device, and input/output devices, each of which is known to generate heat as each operates in a computer. For some electrical components, such as a CPU, a temperature range is often indicated by specifications which set a temperature range indicative of satisfactory and/or optimum performance (hereinafter, as used herein, this temperature and range may also be referred to as "rated temperature"), and often a cooling fan is typically provided in conjunction with electrical components in a computer system to keep the temperature in the system within the rated temperature.

Certain methods for controlling the rotational frequency of such cooling fans for heat dissipation are known in the art and include:

1) Scheme 1: Fan Control at a Constant Rotational Frequency

When a computer system is powered on, heat generating objects begin to operate, and in turn, often generate heat due to their operation. Examples of these "heat generating objects" include but are not limited to a CPU, a hard disk, a power supply, etc.

With particular reference to a CPU, it is known that the amount of heat generated by an operative CPU varies widely depending on the operating conditions, the temperature of the CPU, and the temperature in the housing. For instance, it is known that as a CPU operates, heat is generated and dissipated into the computer housing environment, where the total heat present within a computer housing increases and the temperature within the housing rises accordingly. It is known to offset such a temperature rise by air-cooling of a heat sink (radiation plate) attached on the top of the CPU package, and also through discharging the heated air in the housing to the outside by rotating an attached fan at a constant rotational frequency. Since the amount of heat generated within the housing and the required cooling capacity are in a certain relation, in this scheme 1, the required cooling capacity (also used as the rotational frequency of the fan, herein) is determined assuming a condition in which all the components operate at their maximum heat generation capacity, such that the fan is then driven constantly at the maximum rotational frequency.

2) Scheme 2: Fan Control by Means of a Temperature Sensor

In this second scheme, the rotational frequency of the fan is controlled using the temperature value obtained by a temperature sensor attached to the object to be cooled. That is, a specific rotational frequency is predetermined corresponding to a certain temperature, and the cooling fan is controlled in response to the temperature value obtained from the temperature sensor to maintain the predetermined rotational frequency.

In this second scheme, for instance, the rotational frequency of the fan is controlled in either of: (a) two steps: a stop and a constant rotation steps, or (b) in three steps: a stop, a low speed rotation, and a high speed rotation steps; and the rotational frequency of the fan is switched to a specific value for a set temperature threshold value. However, when the rotational frequency of the fan is controlled in a few steps, it is typically not possible to control the rotational frequency of the fan precisely to a minimum rotational frequency corresponding to the heat generation level of the heat source at each moment.

In the conventional scheme 1, the rotational frequency of the fan is determined assuming a maximum temperature and heat generation of the object to be cooled, and the fan is driven constantly at that rotational frequency; therefore, the fan tends to be driven continuously at a rotational frequency exceeding the cooling capacity normally required at that moment. Therefore, in this second scheme, the rotational frequency of the fan would increase with the increase of heat generation resulting from recent higher standard of specifications of each component, and also speed-up of the fan rotational frequency would be facilitated by the downsizing of the fan itself associated with the downsizing of the computer system. As a consequence, given such tendency, it has become an increasing problem in maintaining a quiet work environment, such as offices. In the conventional scheme 2, the rotational frequency can be lowered on average compared to scheme 1, but when the rotational frequency is switched, the change of rotational frequency itself may also become a noise source which causes one an uncomfortable feeling. This will be further explained using FIG. 1.

Figure 1:
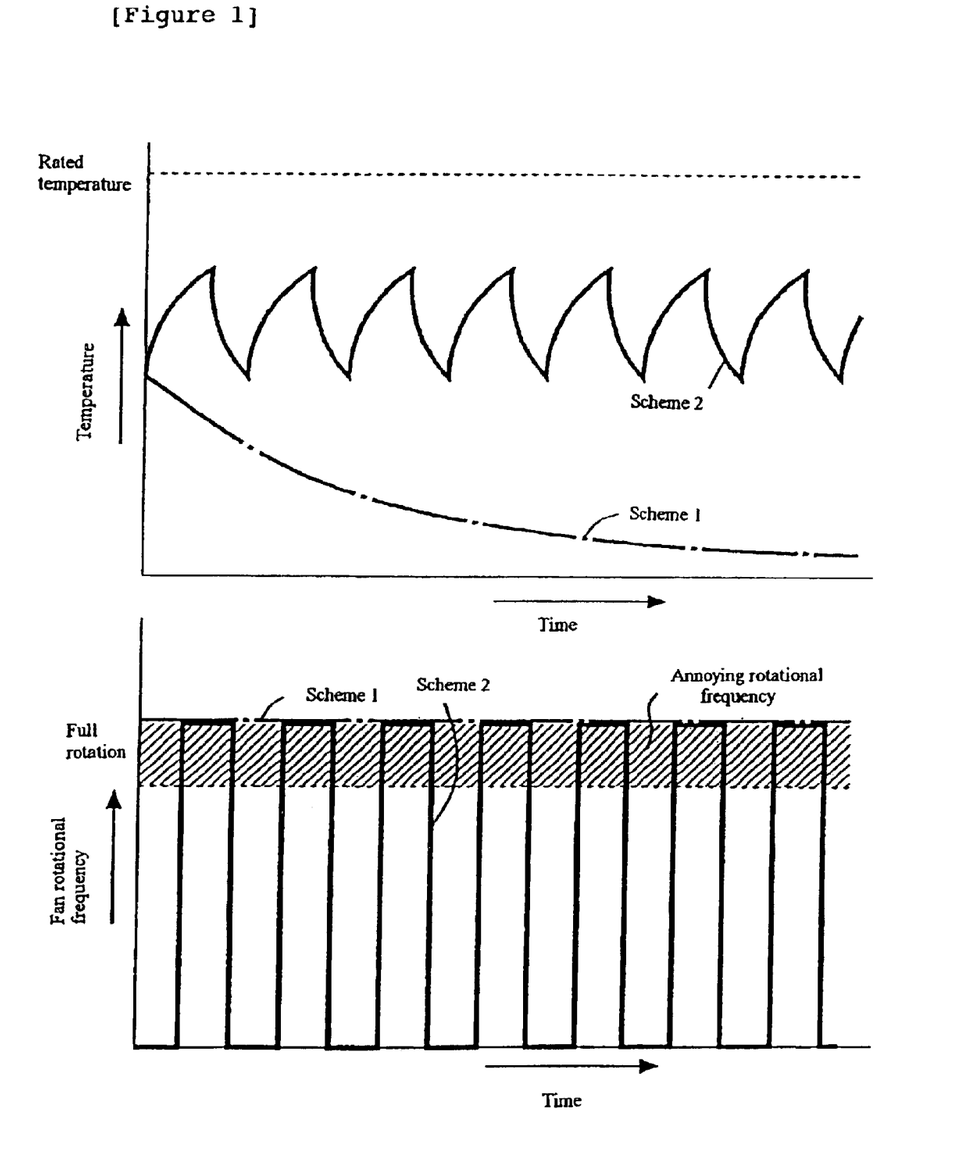
FIG. 1 illustrates the relation between the temperature change and the rotational frequency of the fan in a conventional control scheme.

FIG. 1 illustrates the relation between the temperature change in the object to be cooled and the rotational frequency of the fan in the conventional fan control schemes.

From FIG. 1, the abscissa of each graph represents a time axis. The ordinate of the upper diagram shows how the temperature in the object to be cooled changes in each conventional control scheme. The ordinate of the lower diagram shows how the rotational frequency of the fan changes in each conventional control scheme. The hatched area in the lower diagram represents the range of the rotational frequencies that would cause uncomfortable feeling of a human. As already described, scheme 1 has disadvantages in that the objects to be cooled tend to be cooled more than is actually needed, and the rotating noise of the fan tends to be annoying at most all times. On the other hand, in scheme 2 (an example of two-step cooling is shown here for simplicity), a continuous swelling noise may be generated in the vicinity of the threshold values since the rotational frequency of the fan is constantly switched between specific values.

The method for controlling a cooling fan by means of a temperature sensor as shown in scheme 2 is known in art and more particularly from Published Unexamined Japanese Patent Application No. 6-4294 ("Variable Revolution Controlled Fan") or Published Unexamined Japanese Patent Application No. 9-250489 ("Rotational Frequency Control Apparatus for Cooling Fan"), each of which is incorporated herein by reference.

The former discloses a method for controlling a rotational frequency of a fan utilizing the fuzzy theory based on temperature value detected by a temperature sensor, and the latter discloses a method in which cooling fans and temperature sensors are placed at multiple locations and the rotational frequency of the cooling fan is controlled based on temperature value obtained by the temperature sensors at multiple points. However, both of these Published Applications focus on providing stable cooling and provide a method of switching the control mode of fan at predetermined specific rotational frequencies in accordance with detected temperature value, and therefore, neither discloses a more practical method to realize a fan control at a low noise level while maintaining sufficient cooling performance concurrently.

SUMMARY OF THE INVENTION

The present invention overcomes the above described problems and it is an object of the present invention to realize noise reduction of a cooling fan by controlling the fan rotation to a minimum rotational frequency in accordance with the specification and performance of the heat source.

It is another object of the present invention to control a cooling fan to a minimum allowable rotational frequency within a rated temperature range of the object to be cooled, thereby controlling the internal temperature of a computer system in such a way to minimize noise generation.

It is a further object of the present invention to provide a low noise output and an effective method for controlling a cooling fan based on a relatively simple and low-cost configuration.

BRIEF DESCRIPTION OF THE DRAWINGS

The invention, together with its various features and advantages, can be readily understood from the following more detailed description taken in conjunction with the Figures herein below.

DETAILED DESCRIPTION OF THE INVENTION

The objects described above can be achieved by the present invention and as more particularly described in the following configurations of the present invention.

In the method for controlling a cooling fan in a computer system according to the present invention, a plurality of temperature ranges are defined as not exceeding a predetermined allowable operating temperature (hereinafter also used as "rated temperature") of an object to be cooled (for example, a CPU), and an allowable minimum rotational frequency of the fan is preset as an initial value for each of the temperature ranges. Further, a fine control of the rotational frequency of a fan at continuous levels may be realized by (a) detecting the temperature of the object to be cooled at a predetermined time interval by means of, for example, inputs from a temperature sensor, and storing its value in a memory, (b) determining details of variation in temperature (for instance, temperature has increased or decreased, or the amount of the temperature change is large or small, etc.) by comparing the previously stored temperature value with the detected temperature, and (c) setting the rotational frequency of the cooling fan to an initial value corresponding to the temperature range of the current temperature (after the variation), or to a predetermined value within the current temperature range, a change range of which is smaller than a preset range of the initial values, in accordance with the details of the variation and the current temperature range.

In the configuration which allows setting of the predetermined value with the smaller change ranges than the preset range (for example, 10%) of the above described initial values for the rotational frequency of the cooling fan, a plurality of set levels may be further included so that gradual control of rotational frequency can be realized by reducing the change range (for example 1 to 2%) in lower temperature ranges and increasing it (for example 3 to 4%) in higher temperature ranges. By applying this method particularly while the temperature is rising, it is possible to mitigate noise discomfort caused by start-up rotational frequencies of the fan.

It is preferable to employ a PWM (Pulse Width Modulation) scheme to realize a fine and continuous control of rotational frequency as described above.

As described so far, through a feed back control of the temperature of the object to be cooled and the rotational frequency of the fan, it is possible to reduce the rotational frequency of a fan without exceeding a maximum allowable temperature within the range of the rated temperature of the object to be cooled, and it is also possible to realize a minimum allowable rotational frequency for the amount of heat generation at that moment. Moreover, it is possible to realize such rotational control of a fan in that fan rotation is perceived to be quieter even at same rotational frequency by raising the rotational frequency gradually when it increases and lowering the rotational frequency sharply when it decreases in the range where the noise of fan rotation may become quite annoying to those nearby.

Furthermore, since a relatively simple algorithm is employed in the rotational frequency control of a fan according to the present invention, when the object to be cooled is a CPU, there is no need to introduce an additional CPU because the CPU can control the temperature of itself by software through BIOS on which the CPU operates, and thus, additional cost is minimized.

The present invention will be described below as a method for controlling a cooling fan in which the object to be cooled is a CPU. However, the object to be cooled is not limited to a CPU, and the object of the present invention is achieved by a similar configuration when the object to be cooled is one which has a rated temperature and generates heat as it operates, such as, for example, a graphic accelerator or a memory chip, a hard disk, and a battery.

Figure 2:
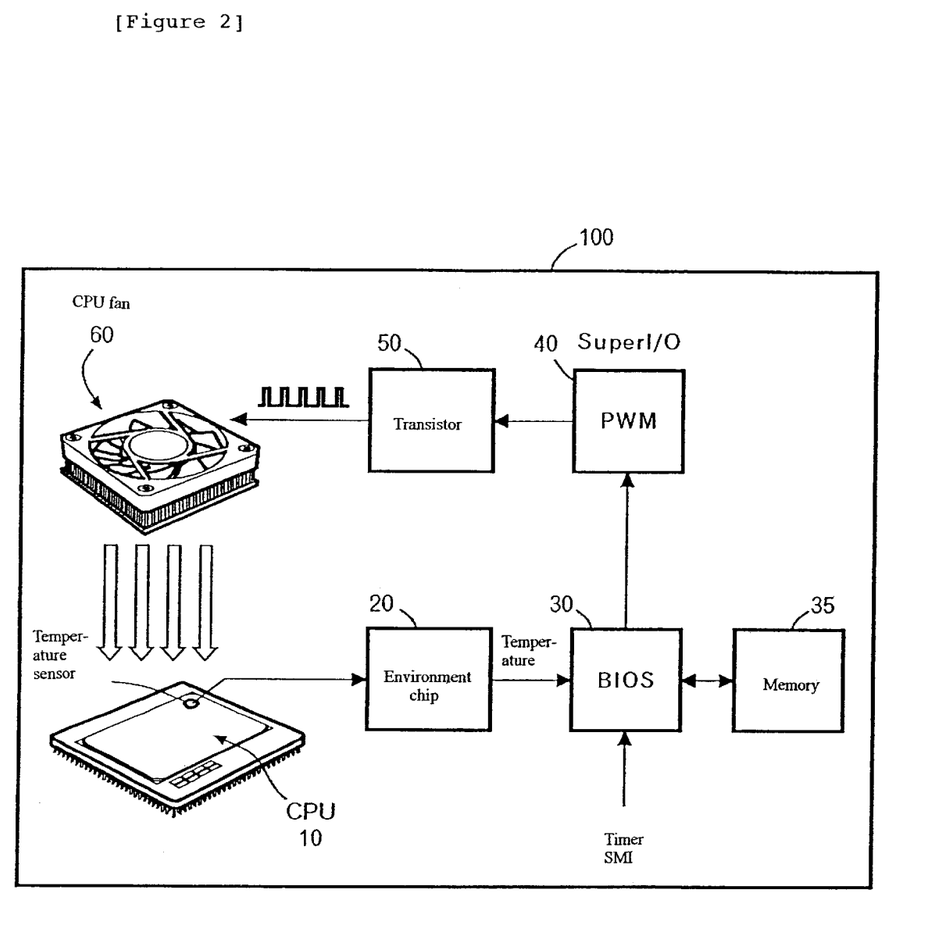
FIG. 2 is a block diagram showing an embodiment of the present invention.

FIG. 2 is a block diagram showing an embodiment of the present invention. In this figure, only the major components of the computer system 100 to implement the present invention is shown. A temperature sensor is built in to the CPU 10 of the computer system 100. Such a temperature sensor is often included in many of the commercially available CPU chips and, in the present invention, this temperature sensor is used to detect the temperature of the CPU which is the object to be cooled. But a separate sensor may be provided when there is no built-in temperature sensor in the object to be cooled.

The temperature signal acquired by the temperature sensor is inputted to an environment chip 20 and converted into digital value. The environment chip 20 is an IC chip which is used normally in many PC boards and is a semiconductor IC which has the function of digitizing signals detected by a temperature sensor or a voltage sensor in order to detect an abnormal temperature or voltage. The temperature value outputted from the environment chip 20 is inputted to BIOS 30 and stored in the memory 35.

In BIOS program 30, a program for fan control according to the present invention is recorded. In the BIOS module 30, interruptions are generated by SMI (System Management Interruption) from the timer at a predetermined interval, and triggered by this, a program for fan control is executed at a constant time interval so that a proper rotational frequency of the fan is determined by extracting necessary temperature value from the memory 35. Further details on the fan control will be described later.

The value of the determined rotational frequency of the fan is inputted into a PWM (Pulse Width Modulation) controller 40. PWM is a kind of pulse modulation scheme in which modulation is made by varying the pulse width in accordance with the signal while keeping the magnitude of the pulse amplitude. The controller may be supplied as a discrete IC, but recently it is supported normally in a super I/O chip (semiconductor which supports serial, parallel, key board, mouse signals, etc.) of the computer system 100. The configuration shown in the figure is the one in which a PWM controller is supported as a standard feature of the super I/O. The rotational frequency of the fan can be changed continuously by turning on/off the power supply for the CPU fan by a PWM scheme. Thus, a more continuous and flexible fan control is possible instead of a control using only specific rotational frequencies which are fixedly determined in accordance with the thresholds of the detected temperature.

In order to convert the output signal of the PWM controller 40 into an ON/OFF current signal for the fan drive, a current drive element (for example, a transistor) 50 is provided for each fan. The rotational frequency of the fan 60 is finally controlled in accordance with this output.

Next, a practical implementation approach of the method for controlling a cooling fan according to the present invention will be described. First, the generic scheme for controlling the rotational frequency of a cooling fan is described, then a specific scheme for realizing a low noise result by exploiting the characteristics of human auditory sense, which is an unique feature of the present invention, will be specifically described.

1. Basic Embodiment in Terms

The present invention provides a method for determining a rotational frequency by a relatively simple conversion rule (a conversion table or a function). For example, in the present invention, it is possible to change the rotational frequency of the fan steplessly (i.e., by a fine and continuous control) through a PWM scheme from the temperature value using the following conversion equation:

$$\text{Rotational frequency} = \text{current rotational frequency} + f(\text{current temperature} - \text{target temperature}) \quad (1)$$

where the target temperature is preset as a temperature which has a margin to the critical temperature within an allowable range not exceeding the rated temperature which is specified according to the specification or property of the object to be cooled. The function f is determined from the air-cooling characteristics of the fan and the housing of the computer system. More specifically, in accordance with the difference (for example, −10 or +5) between current temperature and the target temperature, it is determined to what extent the rotational frequency is to be raised (in case of a positive value) or to what extent the rotational frequency is to be lowered (in case of a negative value).

Specifically, it is realized either by a method to determine an optimum rotational frequency by preparing in advance of a table correspondence of the temperature to the rotational frequency, or by a method to determine the rotational frequency of the fan in real time from the difference between current temperature and the target temperature by predetermining a simple conversion function from experimental results. In the present invention, since the fan control program is stored in a flash-ROM (rewritable ROM) in the computer system, the function is readily modified in accordance with the characteristics of the target object even when its characteristics are changed, and therefore, the fan control program can be easily adapted in accordance with system environments.

2. Embodiment in More Specific Terms

Figure 3:
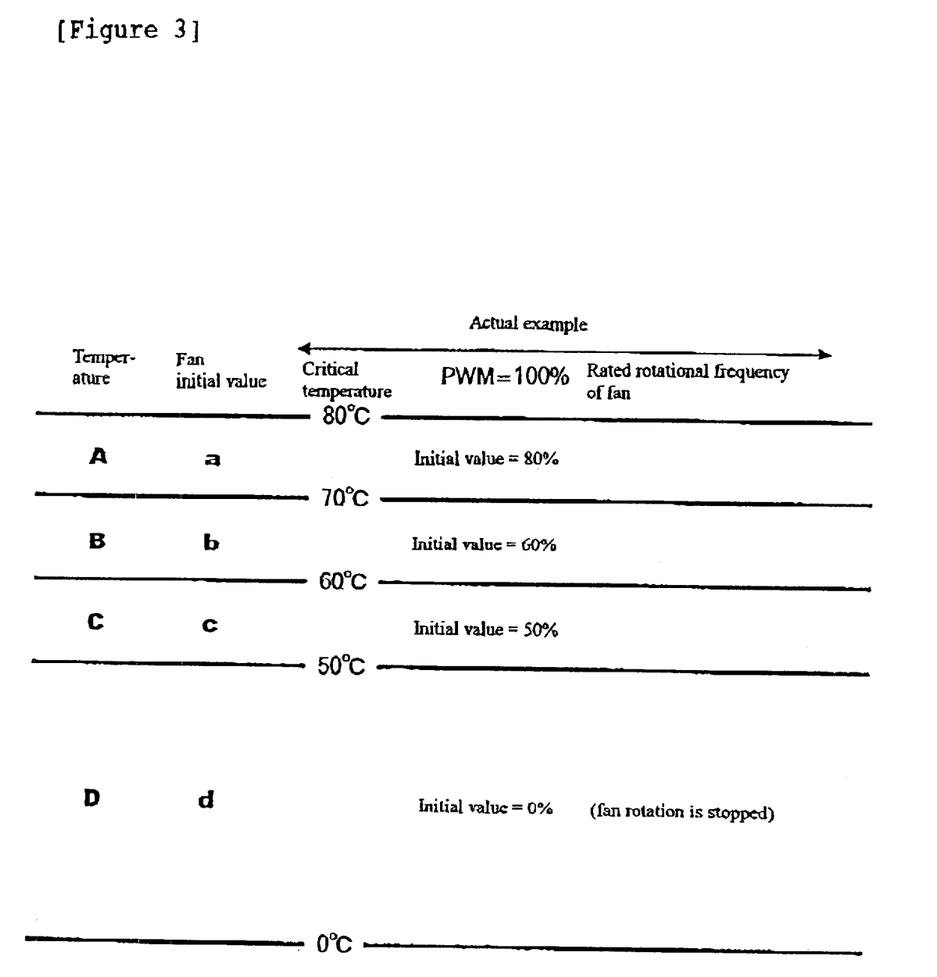
FIG. 3 illustrates the scheme of the fan control according to the present invention.

FIG. 3 illustrates an embodiment of the fan control method according to the present invention. Explanations will be given below in a step-by-step manner.

1) Generally, for an object to be cooled such as a CPU, a critical temperature is specified from its rated specification. In the present embodiment, four temperature ranges A, B, C, and D are set based on the critical temperature.

A: Critical temperature range, where temperature is close to the rated temperature (80° C. in this example) and any temperature rise is not allowable.

B: Target temperature range, where there is still a little margin towards the critical temperature and it is desirable to operate the CPU in this range as long as possible. This range is set to realize a minimum rotational frequency of the fan by setting the temperature of the CPU at a maximum value within its allowable temperature range.

C: Buffer temperature range, where there is still a margin towards the critical temperature, but the temperature may rise close to the critical temperature when there is a sharp rise in temperature.

D: Safe temperature range, where there is enough margin towards the critical temperature and it is possible to cope with a sharp rise in temperature.

2) Next, initial values of rotational frequency of the fan: a, b, c, d are set for each temperature range. In doing so, when the heat dissipation is under steady, the initial values are set at a sufficiently low value so that the temperature would rise. In determining the initial values the relation between the rotational frequency of the fan and its noise is also taken into account because the fan noise becomes perceivably annoying when the rotational frequency exceeds a certain level (for example, 80 to 90% of the maximum rotation frequency). Thus, setting of necessary basic value for controlling the rotational frequency of the fan is completed.

3) When performing the fan control, current temperature range is compared with the past temperature range, and the rotational frequency of the fan is changed in accordance with the details of the variation. But when temperature exceeds the critical temperature, fan is rotated at its maximum frequency. The following are specific control procedures:

3.1) When the temperature is rising;
When the amount of change is large (for example, larger than 10° C.),
initial values a, b, c, d for each temperature range A, B, C, D are set.

When the amount of change is small (for example, less than 10° C.),
   A to A: the rotational frequency is slightly raised (about 3 to 5%).
   B to B: the rotational frequency is slightly raised (about 1 to 2%).
   C to C: initial value c is set.
   D to D: initial value d is set.
3.2) When the temperature is falling;
   initial values a, b, c, d are set respectively.

With the rotational frequency of the fan being controlled as described above, when the temperature rises intensely, initial values are set and thereby the rotational frequency would change sharply, and when the temperature change has become small, the rotational frequency would rise gradually. The reason why the levels at which the rotational frequency is increased are different between range A and range B is that the need for cooling is larger in higher temperature ranges. When the temperature is falling, the rotational frequency is controlled so that the rotational frequency changes greatly at a time, and when the rotational frequency has risen gradually depending on the operational condition thereafter, then the rotational frequency of the fan is raised within a minimum range according to the control procedure 3.1).

Figure 4:
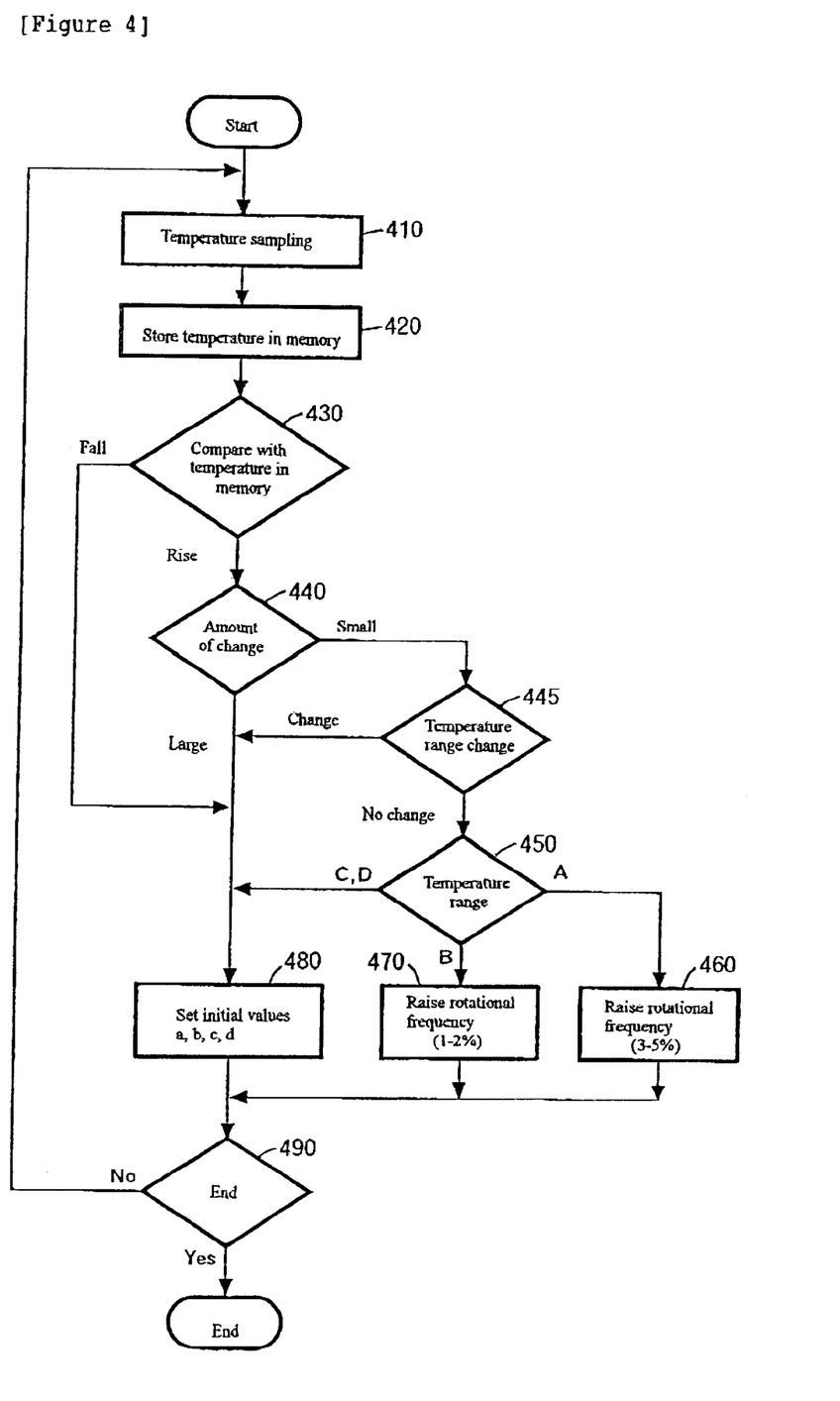
FIG. 4 is a flowchart showing the operation of an embodiment of the present invention; and, FIG. 5 illustrates the relation between the temperature change and the rotational frequency of the fan in the fan control scheme according to the present invention.

FIG. 4 is a flowchart showing the operation of the present invention. In the fan control according to the present invention, temperature value are first sampled from the temperature sensor at a constant time interval to detect the temperature of the object to be cooled (step 410). The timing of the sampling may be defined in a program in advance, but in the present invention, interruptions (SMI) from the timer are used for the processing. The sampled temperature value are temporarily stored in the memory 35 for later processing (step 420).

The stored temperature value are compared with the temperature value which were sampled at a previous timing and the amount of change in the temperature of the object to be cooled is calculated (step 430). In the present invention, as described above, a plurality of temperature ranges (A to D) with a constant interval, for example, 10° C. interval, are preset based on the rated temperature of the object to be cooled, and the initial values (a to d) for the rotational frequency of the fan are determined corresponding to each of the temperature ranges. And when the temperature is rising, different rotational control of the fan is performed in accordance with the temperature range to which current temperature belongs, and the rotational frequency of the fan is arranged to increase gradually as it comes close to rotational frequencies which would cause discomfort to human ears. When the temperature is falling, the rotational frequency is arranged to be decreased sharply. This is the result of considering such characteristics of human ears that when the rotational frequency of the fan is raised rapidly fan noise is uncomfortable to the ears, but when it is raised gradually, the noise is relatively less annoying.

In specific terms, when it is determined in step 430 that the temperature of the object to be cooled is rising, the amount of change is judged as large or as small in step 440. When the amount of change is small (herein difference is less than 10° C. which is the range of the temperature range), it is determined whether the temperature range has or has not changed using the previous temperature value (step 445). When the temperature range has changed, it goes to the processing step similar to that of the case in which the amount of change is large. When there has been no change in temperature range, rotational frequency is controlled in different manners depending on the temperature range to which current temperature belongs (step 450). This arrangement is made to minimize the rotational frequency within the range needed to control the object to be cooled within its rated temperature for each temperature range. Specifically, since cooling is required when the temperature is within the high temperature range A, the rotational frequency of the fan is slightly raised (for example, 3 to 5%) (step 460), and when the temperature is within the appropriate temperature range B, the rotational frequency of the fan is raised less than in the case of A (for example, 1 to 2%) (step 470). And when the temperature is within the relatively safe ranges C and D, the rotational frequency is maintained at the initial values c, d respectively (step 480). As a result of maintaining the rotational frequency, the temperature may gradually rises depending on the operational state of the object to be cooled; however, in that case, appropriate fan control is realized in determination blocks 440, 445 at a later timing.

On the other hand, when the amount of change in the temperature of the object to be cooled is large (in this example, when the difference is larger than 10° C. which is the range of the temperature range, and when the temperature range has changed), the rotational frequency needs to be raised more than in the case in which the amount of change is small, so the rotational frequency is set at an initial value which is preset corresponding to the temperature range to which current temperature belongs after the temperature rise (step 480). For example, when the temperature rises from the temperature range C to temperature range B, the rotational frequency is raised from 50% to 60%, and when the temperature range rises from C to A, the rotational frequency of the fan is raised from 50% to 80% (see FIG. 3).

When the temperature of the object to be cooled has fallen, the rotational frequency of the fan is set at the initial value for the temperature range to which current temperature belongs after the fall (step 480). In this way, for example, when the temperature range has fallen from B to C, the rotational frequency is lowered 10% (60% to 50%) at a time, and when the temperature range has fallen from C to D, the rotation of the fan is stopped (see FIG. 3). The above described fan control is continued until the processing according to the present invention becomes unnecessary due to a power-off, for example (step 490).

Since the temperature control can be implemented without a large amount of calculation by employing a relatively simple control scheme as described above, it is possible to make, for example, the CPU of the computer system, which is the object to be cooled, control itself concurrently. A SMI (System Management Interruption) function of the CPU can be utilized to make the CPU of the computer system concurrently perform the function of temperature control. By setting the SMI to be generated at the time interval of the temperature sampling so that the SMI program operates at a constant time interval, and by performing above mentioned control within this program, it is possible to perform the control without affecting the tasks of the computer itself. But if it takes too much time for the processing in the SMI, the performance of the computer system would be adversely affected, therefore the algorithm must be simple so as to be processed in negligibly small amount of time.

Figure 5:
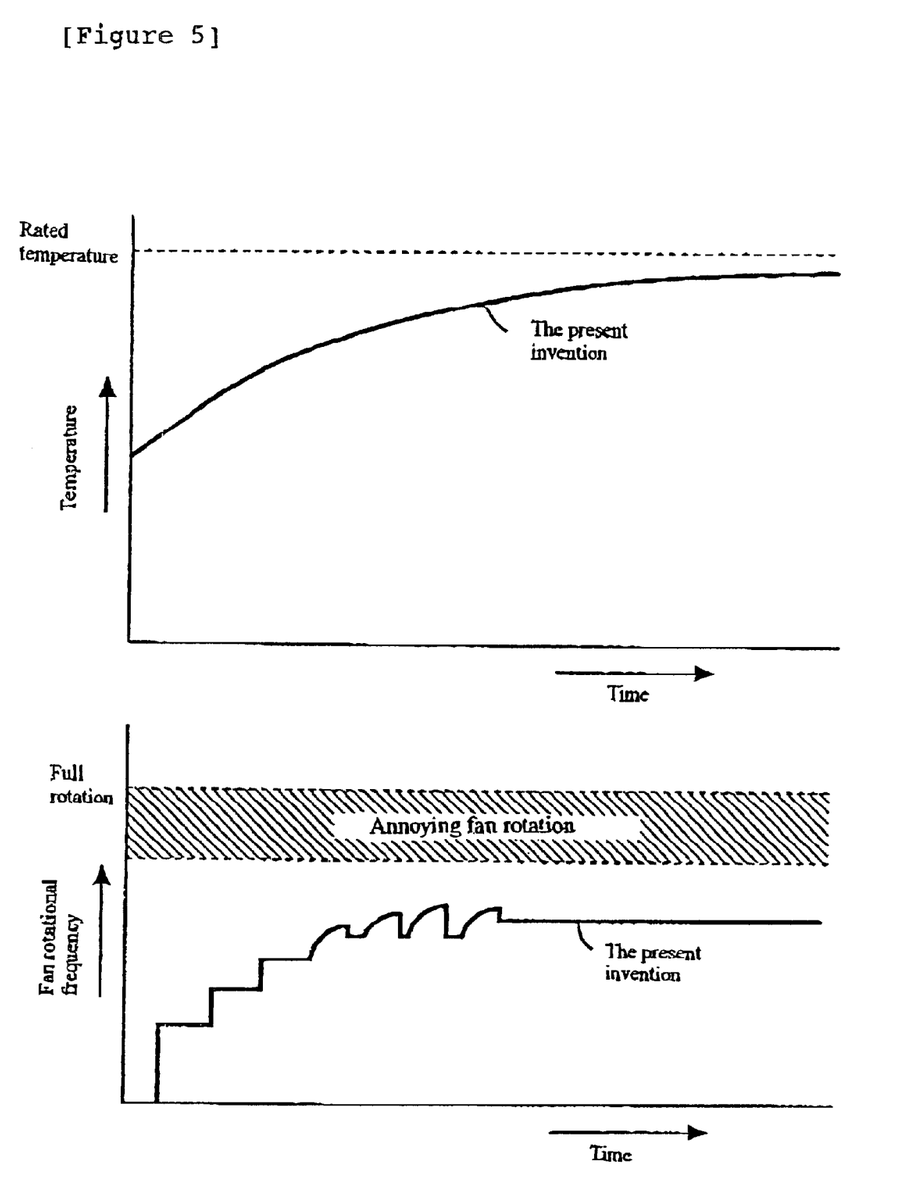

FIG. 5 is a diagram showing the relation between the temperature change in the object to be cooled and the rotational frequency of the fan according to the present invention. As shown in the figure, the rotational frequency increases stepwise to an initial value while the amount of the increase is large, and increases gradually when the temperature change becomes slow. And the rotational frequency falls at a stroke when it falls. While the rotational frequency is controlled in this way, the temperature of the object to be cooled would never exceed its rated temperature as shown in the figure.

Since the audible sense of a human is less sensitive when the change of sound is small and more sensitive when the change of sound is large, the threshold for annoyance varies even for same rotational frequency depending on the change course of the rotational frequency. When the rotational frequency is changed gradually while it is increasing as described above, an increase of the rotational frequency becomes less perceptible and a decrease of it becomes more perceptible. Therefore, the threshold for annoyance becomes higher thereby giving the user quieter impressions. Although the rotational frequency changes stepwise in a lower temperature range, the noise is not annoying factor because the rotational frequency will never be substantially large.

The present invention as described above, for the purposes of effecting a summary understanding, without limiting the scope of the present invention, may also be understood as follows:

Owing to the feed back control of the rotational frequency based on measured temperature with its highest priority placed on decreasing the rotational frequency of the fan, the rotational frequency of the fan can be reduced to a level at which fan noise is not annoying most of the time when the working rate of the object to be cooled (for example, a CPU) is at a normal level. In practice, it is not so frequent that rapid cooling is needed due to the concentration of processing load on the object to be cooled.

Moreover, according to the present invention, it is possible to reduce the fan noise taking the human sense into consideration. Specifically, it is possible to ergonomically mitigate the discomfort due to the short-term variation of the working rate of the CPU by increasing the rotational frequency gradually and by decreasing the rotational frequency with the temperature fall taking the human sense of noise into account.

Furthermore, since major components of the control system are standard parts (environment chips, super I/O chips with a built-in PWM controller, and etc.) in the computer system, special hardware parts and additional costs due to additional utilities such as device drivers are minimized because the fan control is controlled by BIOS. To this is also contributed the fact that, by employing a relatively simple control method, it is possible to make the CPU perform the temperature control of itself concurrently without being overloaded. In case of the CPU of the embodiment, only parts needed to be added are N transistors (corresponding to the number of cooling fans) for PWM drive of the fan, thus additional costs are extremely low.

What is claimed is:

1. A method for controlling a cooling fan in a computer system, wherein a plurality of temperature ranges are defined as not exceeding a predetermined allowable operating temperature of an object to be cooled in the computer system, and an allowable minimum rotational frequency of the fan is preset for each of said temperature ranges as an initial value, said method comprising the steps of:
   (a) detecting a current temperature of said object to be cooled at a predetermined time interval and storing its value in a memory;
   (b) determining variation in temperature by the current temperature detected in said step (a) with comparing a previously stored temperature value; and
   (c) setting the rotational frequency of said cooling fan to an initial value corresponding to the temperature range of the current temperature, or to one of predetermined values within the current temperature range, a change range of which is smaller than a preset range of said initial values, in accordance with details of the variation determined in step (b) and said current temperature range,
wherein setting the rotational frequency to one of said predetermined values in said setting step, further includes a plurality of set levels so that the change range is smaller in lower temperature ranges and is larger in higher temperature ranges.

2. The method for controlling a cooling fan according to claim 1, wherein a PWM scheme is employed in said setting step.

3. A control apparatus for a cooling fan in a computer system, comprising:
   a cooling fan to cool an object to be cooled in said computer system;
   a temperature sensor to detect a current temperature of said object to be cooled;
   a memory to store temperature value detected by said temperature sensor; and a control module to compare the current temperature value detected by said temperature sensor with a temperature value previously stored in said memory and to control rotational frequency of the cooling fan in accordance with the comparison result, wherein said control module includes:
   (a) an initial value setting module for storing a plurality of temperature ranges defined as not exceeding a predetermined allowable operating temperature of the object to be cooled, and initial values each of which defines an allowable minimum rotational frequency of the fan for each of said temperature ranges; and
   (b) a rotational frequency determination module for determining variation in temperature of said object to be cooled from the comparison results, and for setting said rotational frequency of the fan to a corresponding initial value defined in said setting module, or to one of predetermined values within the temperature range of the current temperature, a change range of which is smaller than a preset range of said initial values, in accordance with details of the variation and the current temperature range, wherein setting to one of predetermined values in said rotational frequency determination module further includes a plurality of set levels so that the change range is smaller in lower temperature ranges and is larger in higher temperature ranges.

4. The control apparatus for a cooling fan according to claim 3, wherein a PWM scheme is employed in said rotational frequency determination module.

5. The control apparatus for a cooling fan according to claim 3, wherein the processing in said control module is performed as one of the functions of said object to be cooled.

* * * * *